United States Patent

Rethwish

[15] 3,637,165

[45] Jan. 25, 1972

[54] TAPE DECK

[72] Inventor: William F. Rethwish, Bonita, Calif.

[73] Assignee: Rohr Corporation, Chula Vista, Calif.

[22] Filed: Dec. 12, 1969

[21] Appl. No.: 884,634

[52] U.S. Cl. ..............................242/199, 226/181, 226/190, 242/209

[51] Int. Cl. .................G03b 1/04, G11b 15/32, G11b 23/04

[58] Field of Search ........................................242/198–209; 226/181–187, 190

[56] References Cited

UNITED STATES PATENTS 2,911,162 11/1959 Kyle, Jr. ..............................242/200 X

*Primary Examiner*—Leonard D. Christian
*Attorney*—George E. Pearson

[57] ABSTRACT

Tape deck for use with two-reel magnetic tape cartridge includes torque motors for tensioning tape extended between the reels of the cartridge and two capstans situated on opposite sides of a magnetic head and rotated by a stepping motor. In an operative mode of the apparatus, pinch rollers hold the tape against the capstans and control means operate synchronously with the stepping motor to cause one roller to exert increased pressure on its associated capstan and the tape therebetween when the capstans are rotated in one direction, and to cause the other roller to exert increased pressure on its associated capstan and the tape therebetween when the capstans are rotated in the opposite direction. The control means can mechanically be adjusted to vary the pressure which the pinch rollers exert against the tape. When the tape cartridge is to be removed from the tape deck, a manually operated positioning member moves the rollers and other components away from the tape and also electrically disconnects all power to the tape deck and releases the cartridge.

10 Claims, 11 Drawing Figures

INVENTOR.
WILLIAM F. RETHWISH
BY Edwin D. Grant
ATTORNEY

INVENTOR.
WILLIAM F. RETHWISH
BY Edwin D. Grant
ATTORNEY

INVENTOR.
WILLIAM F. RETHWISH
BY Edwin D. Grant
ATTORNEY

INVENTOR.
WILLIAM F. RETHWISH
BY Edwin D. Grant
ATTORNEY

INVENTOR.
WILLIAM F. RETHWISH
BY Edwin D. Grant
ATTORNEY

*INVENTOR.*
WILLIAM F. RETHWISH
BY Edwin D. Grant
ATTORNEY

INVENTOR.
WILLIAM F RETHWISH
BY Edwin D. Grant
ATTORNEY

TAPE DECK

SUMMARY OF THE INVENTION

This invention relates to a magnetic tape deck and more particularly to improved apparatus for controlling the movement of magnetic tape past a recording or reproducing head.

In many types of electronic equipment magnetic tape must be rapidly moved back and forth under a magnetic head while being held taut to maintain an adequate surface contact between the tape and the head. By means of the apparatus disclosed herein precise movement of magnetic tape across a magnetic head is effected by quick-acting drive mechanisms which utilize solenoids to selectively apply a predetermined pressure to a portion of said tape which is held between two capstans and two pinch rollers respectively associated therewith. The arrangement of the drive mechanisms is such that the pressure applied to the tape by the action of the solenoids can readily be adjusted, thus making it possible to adjust the tension of the tape to an optimum value and thereby eliminating slippage between the tape and the rollers and capstans and resultant slackness in the tape. Apparatus in accordance with the invention also includes a positioning member which can be manually moved between a position wherein it places components of the apparatus in an operative condition (electrically, mechanically) and holds a tape cartridge in fixed position adjacent a magnetic tape head, and a position wherein it places said components in an inoperative condition (electrically, mechanically) and releases said cartridge from its fixed position.

More specifically, the preferred embodiment of this invention comprises a panel which has at least one magnetic tape head mounted on the front side thereof. Disposed under the head is a support member adapted to engage the lower edge of a two-reel magnetic tape cartridge. A pair of capstans are journaled in apertures formed in the panel adjacent the head and located on opposite sides thereof, said capstans projecting perpendicularly from each side of the panel and also being journaled in apertures formed in a support plate that is fixedly positioned in spaced, parallel relation with the rear side of the panel. An electric stepping motor is mounted on the support plate and rotates both capstans through a suitable drive arrangement. A pair of shafts are journaled in apertures respectively located adjacent the capstans, said shafts projecting perpendicularly from each side of the panel and being journaled in apertures in the support plate. The portion of each shaft which projects from the front side of the panel has an arm fixedly connected thereto, and a pinch roller formed of a suitable resilient material is mounted on the free end of the latter. Each shaft has a lever fixedly connected to the portion thereof which is disposed between the panel and support plates, said lever having a rod slidably disposed in a bore formed in an offset portion of the outer end thereof. This rod projects from the bore in which it is positioned and is biased toward a predetermined position on the lever by means of a spring disposed within the bore. Mounted on the support plate are two solenoid-operated actuators each of which is provided with a drive member engageable with the projecting end of a respective one of the rods to thereby apply torque to the shaft associated with the latter. When the shafts are rotated to a first angular position the rollers carried thereby engage tape extended between the reels of the aforesaid cartridge and press the same against the capstans. A pair of electric torque motors are attached to the rear side of the panel and the drive shafts thereof extend through holes in said panel and respectively engage the reels of the aforesaid tape cartridge, so that when the torque motors are operated, equal and oppositely directed forces are applied to the tape extended under the magnetic head. Thus when one of the actuators is operated to thereby apply torque to the shaft associated therewith, the pinch roller carried by said shaft exerts an increased pressure against that portion of the tape disposed between it and the adjacent capstan, the latter being simultaneously rotated by the stepping motor in the direction which moves the tape toward said roller and capstan. The other capstan is simultaneously rotated in the same direction by the stepping motor, but the other actuator is not operated and therefore the pressure which is exerted against the tape by the roller associated with this capstan is not increased. Hence, although both sets of the rollers and capstans move the tape in the same direction (and eliminate the balance between the equal and opposite force exerted against the tape by the torque motors), the roller-capstan pair toward which the tape moves is arranged to exert greater translating force upon the tape than the other roller-capstan pair. Means are provided which permit adjustment of the pressure which the two sets of rollers and capstans exert upon the tape.

A triangular plate (referred to hereinafter as the positioning plate) is mounted on the rear side of the panel so that it can be moved by means of a lever located on the front side of said panel. When this positioning plate is moved toward the tape extended between the reels of the tape cartridge, it disengages from the contact of an electric switch and thereby cuts off power to the aforesaid stepping motor, actuators, and torque motors. At the same time the positioning plate moves other components of the tape deck to an inoperative position and releases the tape cartridge so that it can be removed from the panel.

DESCRIPTION OF THE DRAWINGS

In the drawings.

Throughout the drawings and the following specification, the same numbers designate the same parts.

DETAILED DESCRIPTION

Figure 1:
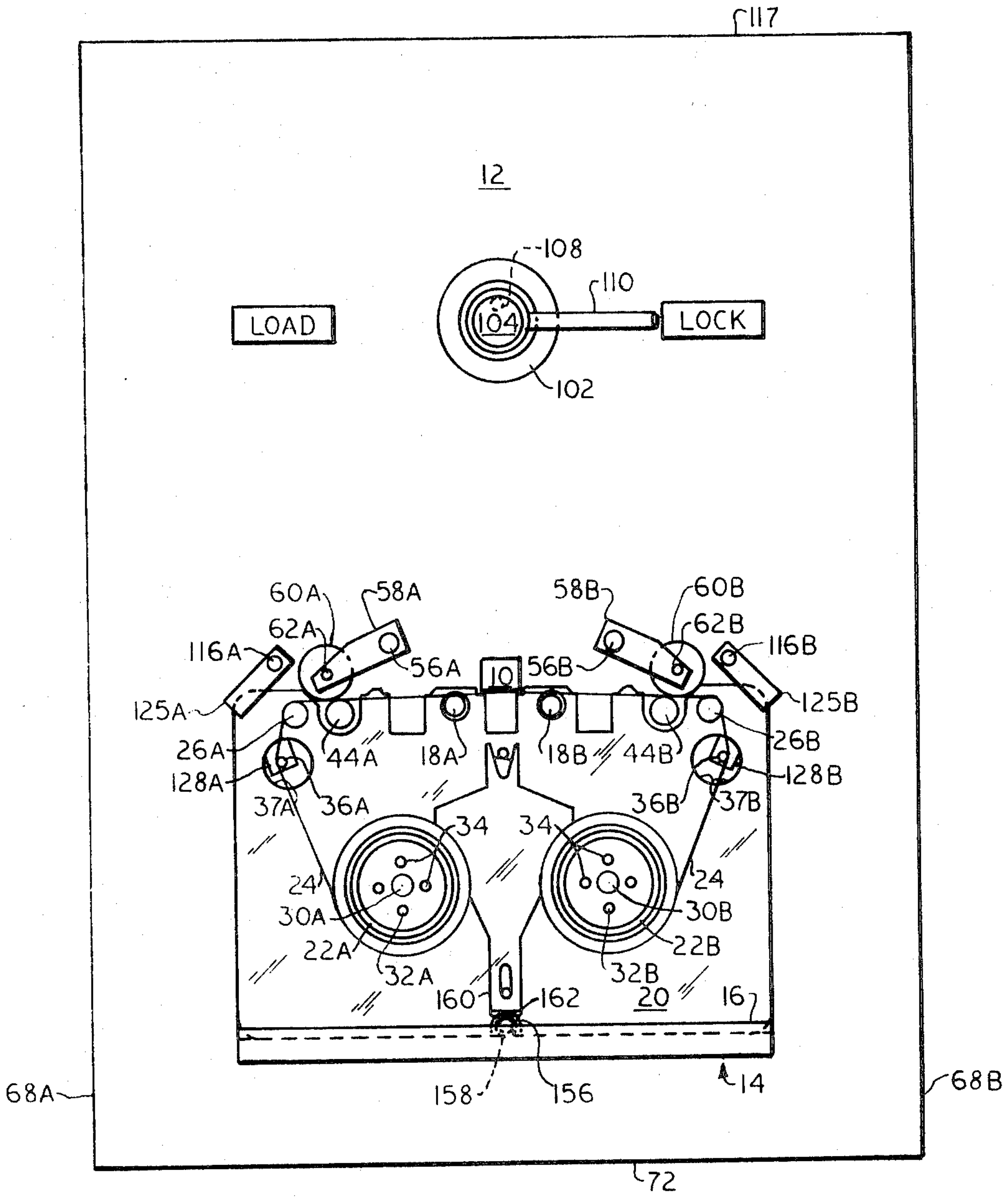
FIG. 1 is a front elevation of a preferred embodiment of the invention.

In the exemplary embodiment which is illustrated in the drawings, a magnetic tape head 10 and a support bar are fixed in position on the front side of a rectangular panel 12, the support bar being generally designated by the number 14 and comprising an upwardly projecting lip 16 (see FIG. 2) which extends along the outer edge thereof and which is thus evenly spaced from said panel. A pair of pins 18A, 18B are fixed in position on the panel and project perpendicularly therefrom on opposite sides of head 10. The pins and support bar 14 are located so that when the lower edge of a magnetic tape cartridge 20 is placed against the upper surface of the outwardly projecting portion of said support bar the pins fit within holes formed in the upper portion of said cartridge. Two reels 22A, 22B are mounted in the cartridge for rotation about axes which are perpendicular to panel 12 when the cartridge is attached thereon as illustrated in FIG. 1. A magnetic tape 24 is wound on the reels and extends therebetween. More particularly, the tape extends upwardly from each reel to a respective one of two guide pins 26A, 26B integrally joined to the sidewalls of the cartridge and disposed therebetween, and then the tape extends across the upper edge of the cartridge and under head 10. As the cartridge is being attached to the panel the pointed ends of pins 18A, 18B engage the lower side of the tape and the latter is lifted by the pins to place it in the proper relation with head 10. Mounted on the rear side of panel 12 are two electric motors 28A, 28B (see FIG. 3) the drive shafts 30A, 30B (see FIG. 1) of which extend through holes in panel 12. Each drive shaft is provided with a pin 32A, 32B which is disposed in fixed, spaced, and parallel relation with the free end thereof, and when cartridge 20 is attached to the panel the ends of the drive shafts respectively enter holes centrally located in reels 22A, 22B, and the ends of the pins mounted on said drive shafts respectively enter one of four holes 34 which are evenly spaced around each of said centrally located holes. The reels are then fixed on the drive shafts so that they rotate therewith. At the same time two pins 36A, 36B respectively enter holes 37A, 37B which extend through the sidewalls of the cartridge adjacent guide pins 26A, 26B and which respectively register with holes 38A, 38B formed in panel 12. The components associated with these pins will be described in detail hereinafter.

Figure 2:
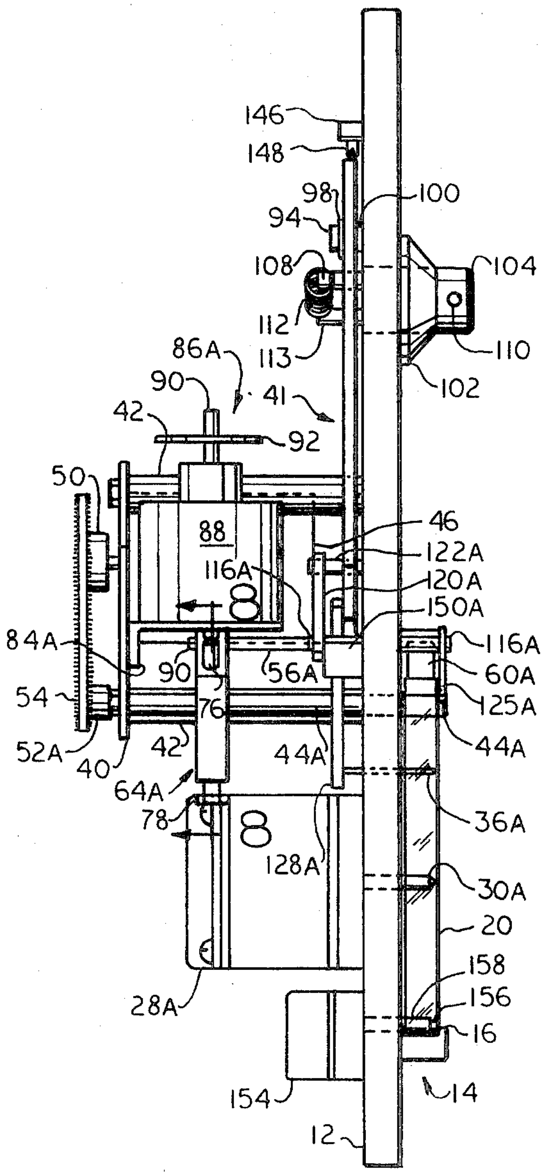
FIG. 2 is a side elevation of the same embodiment.

As illustrated in edge view in FIG. 2 and in fragmentary form in FIG. 3, a support plate 40 is held in fixed, spaced, and parallel relation with panel 12 by four posts 42 which are connected at opposite ends thereof to said support plate and said panel and two of which extend through an opening in a movable plate 41 that will be described hereinafter. Half of the support plate is cut away in FIG. 3 in order to show components which are disposed between the support plate and the panel. A pair of shafts, or capstans, 44A, 44B are journaled in both the panel and the support plate, the ends of these capstans projecting from the front side of the panel so as to extend under tape 24 and also projecting from the rear side of the support plate. Mounted on the side of the support plate which faces the panel is an electric motor 46 (referred to hereinafter as the stepping motor) the drive shaft 48 of which extends through a hole in the support plate and has a gear 50 mounted on the free end thereof. Two gears 52A, 52B (see FIG. 4) are also respectively mounted on the ends of the capstans which project from the rear side of the support plate, and a continuous belt 54 is engaged with these gears and with gear 50. The belt is preferably provided with a plurality of projections which extend laterally from opposite sides thereof as illustrated in FIG. 2, and each gear has two rows of teeth which engage the aforesaid projections. A belt having the described construction is supplied by Pic Design Corporation of East Rockaway, New York, as their Part. No. FC6–56.

Figure 7:
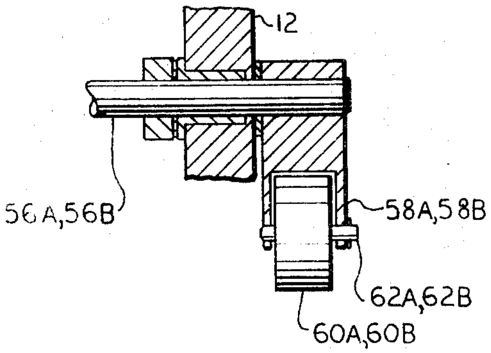
FIGS. 7–11 are enlarged detail view of components of the embodiment.

Two control shafts 56A, 56B are also journaled in support plate 40 and panel 12 and project from the front side of said panel. A roller support 58A, 58B (a typical one of which is illustrated in detail in FIG. 7) is attached to the forward, projecting end of each control shaft and extends laterally therefrom, each roller support being formed at its free end with a pair of parallel arms and a rubber pinch roller 60A, 60B being rotatably mounted on a pin 62A, 62B the ends of which are respectively disposed within apertures formed in said arms. The longitudinal axes of capstans 44A, 44B, control shafts 56A, 56B, and pins 62A, 62B are disposed perpendicular to the sides of panel 12, and the roller supports 58A, 58B and rollers 60A, 60B are arranged so that the latterhold tape 24 against said capstans when said control shafts are rotated to a first angular position relative to panel 12 (the shafts being in the first position in FIGS. 1–3).

Figure 8:
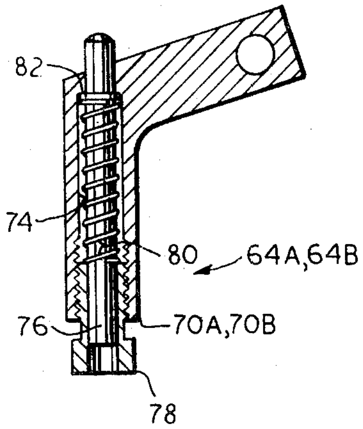

A first lever, generally designated 64A or 64B, is fixedly connected to each control shaft between panel 12 and support plate 40. More specifically, each first lever comprises a first portion 66 which projects perpendicularly from the shaft to which it is connected and toward a respective one of the side edges 68A, 68B of panel 12, and a second portion 70 which extends laterally from said first portion and toward the lower edge 72 of said panel, the longitudinal axes of said first and second portions lying in the same plane. As can be seen in FIG. 8 which illustrates a typical one of the first levers in longitudinal section, a bore 74 extends axially through second portion 70. This bore has a reduced diameter at the end thereof which is adjacent first portion 66 of the lever, and is threaded at its other end. Disposed within the bore of each first lever is a rod which is generally designated by the number 76. One end of each rod is slidably disposed within the reduced diameter portion of bore 74 and projects upwardly from the upper edge of first portion 66 of the first lever, and the other end of the rod is slidably disposed within an annular nut 78 that is engaged within the threaded end of said bore. A helical spring 80 is positioned around each rod and at one end thereof abuts the inner end of nut 78 and at the other end thereof abuts a shoulder 82 which is integrally formed on said rod.

Figure 6:
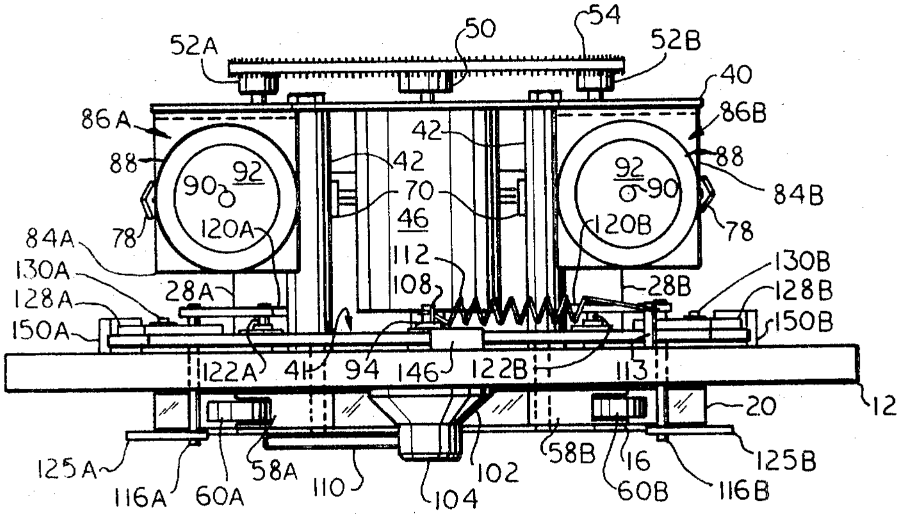
FIG. 6 is a plan view of the embodiment.

Fixedly attached to the side of support plate 40 which faces panel 12 and respectively located above capstans 44A, 44B are two brackets 84A, 84B (see FIG. 6). Each bracket fixedly supports an actuator, generally designated 86A, 86B, which comprises a cylindrical casing 88 containing a solenoid (not shown) and a rod or drive member 90 which extends through the throat of said solenoid and the lower end of which engages the upper end of a respective one of the rods 76. Fixedly mounted on each drive member 90 adjacent the upper end thereof is a disk 92. As will be further considered hereinafter, each solenoid is electrically connected to electronic components (not shown) associated with the described tape deck assembly.

Figure 4:
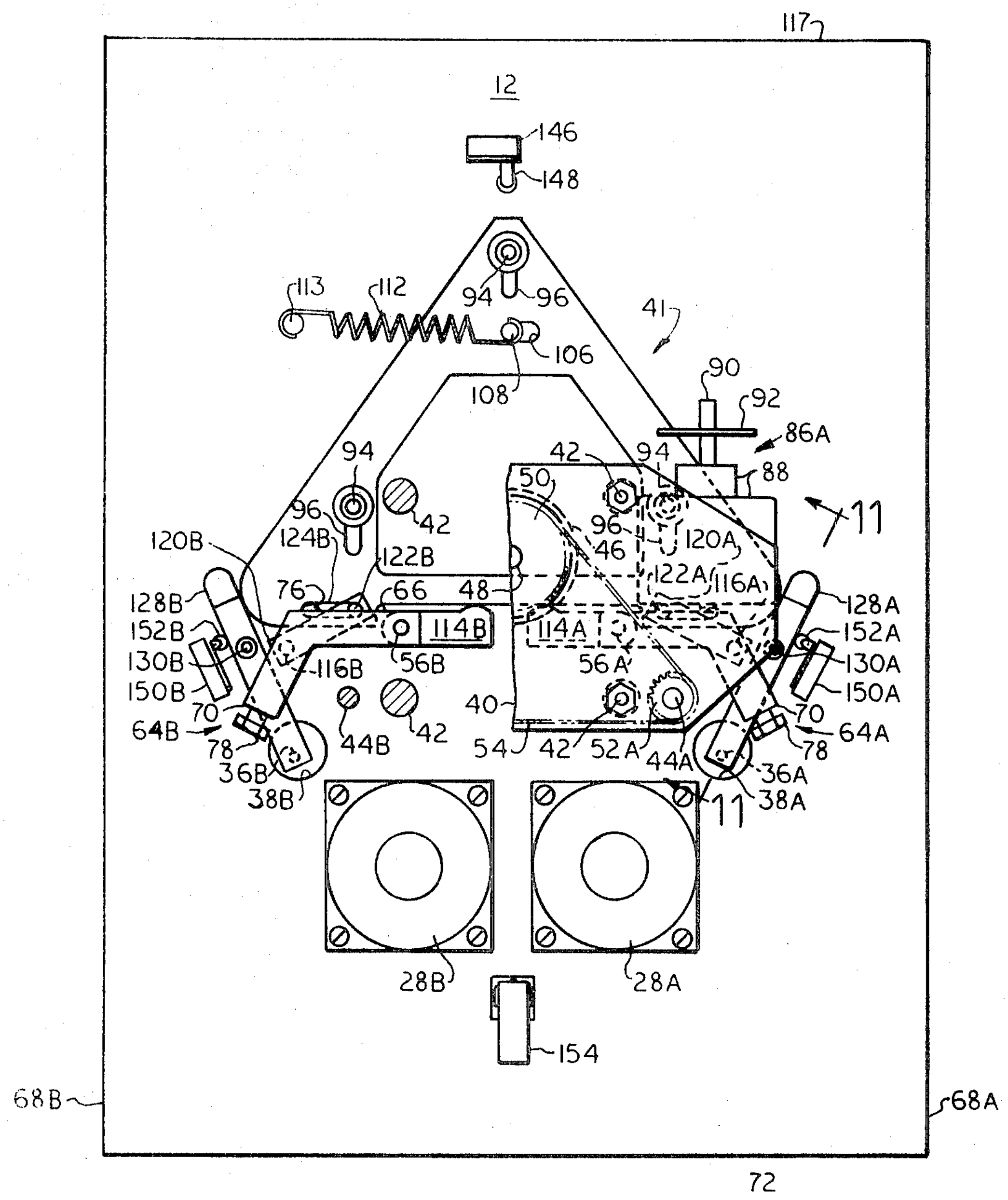
FIG. 4 is another rear elevation illustrating a different position of certain components.
Figure 5:
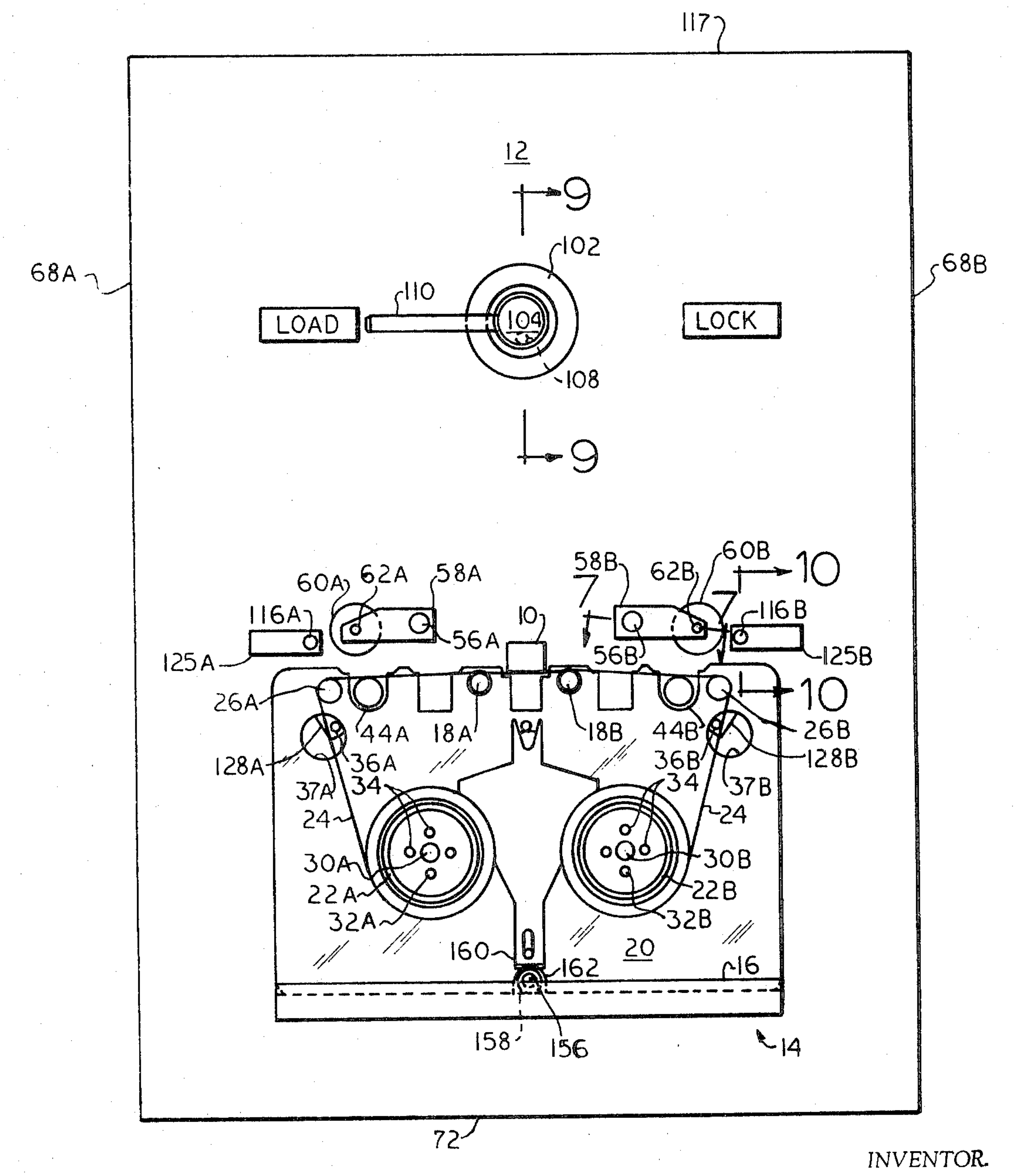
FIG. 5 is a front elevation illustrating a different position of certain components.
Figure 9:
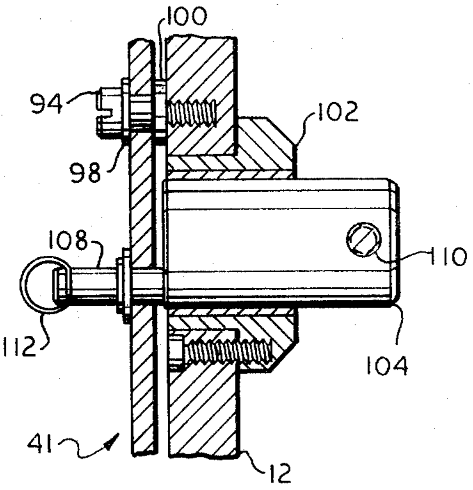

The number 41 generally designates a triangular, centrally apertured positioning plate which is attached to the rear side of panel 12 by means of three screws 94 which are engaged within threaded holes in said panel and which extend through slots 96 formed in said plate and through washers 98, 100 disposed on opposite sides of the latter, the longitudinal axes of said slots 96 being parallel with the side edges of panel 12. Screws 94 are turned into their mounting holes in the panel so as to slidably hold the positioning plate between the washers, and the width of slots 96 is only slightly greater than the diameter of the shanks of said screws, thus permitting movement of the positioning plate in a direction parallel with the side edges 68A, 68B of the panel while preventing movement of said plate toward said side edges. At the upper portion of panel 12 is an aperture in which a bushing 102 is fixedly disposed (see FIG. 9 which is a sectional view of the panel taken along the plane represented by line 9–9 in FIG. 3 and in the direction indicated therein). A short shaft 104 is rotatably mounted within the aperture of the aforesaid bushing and projects therefrom on the front side of panel 12. As can be seen in FIG. 3, a slot 106 is formed in positioning plate 41 adjacent the uppermost slot 96, the longitudinal axis of said slot 106 being perpendicular to the longitudinal axes of slots 96. A pin 108 is eccentrically mounted on the rear end of shaft 104 and extends through slot 106, and a lever 110 is mounted on the forward end of said shaft and extends laterally therefrom. When lever 110 is positioned as illustrated in FIG. 1, the positioning plate is located by pin 108 in the first position that is illustrated in FIGS. 2 and 3. When the lever is manually turned to the position thereof which is illustrated in FIG. 4, the positioning plate is moved by pin 108 to the second position thereof that is illustrated in FIGS. 5 and 6. The positioning plate is slightly biased against movement away from both the first and second positions thereof by means of a helical spring 112 one end of which is connected to a post 113 secured to panel 12 and the other end of which is connected to pin 108.

Figure 3:
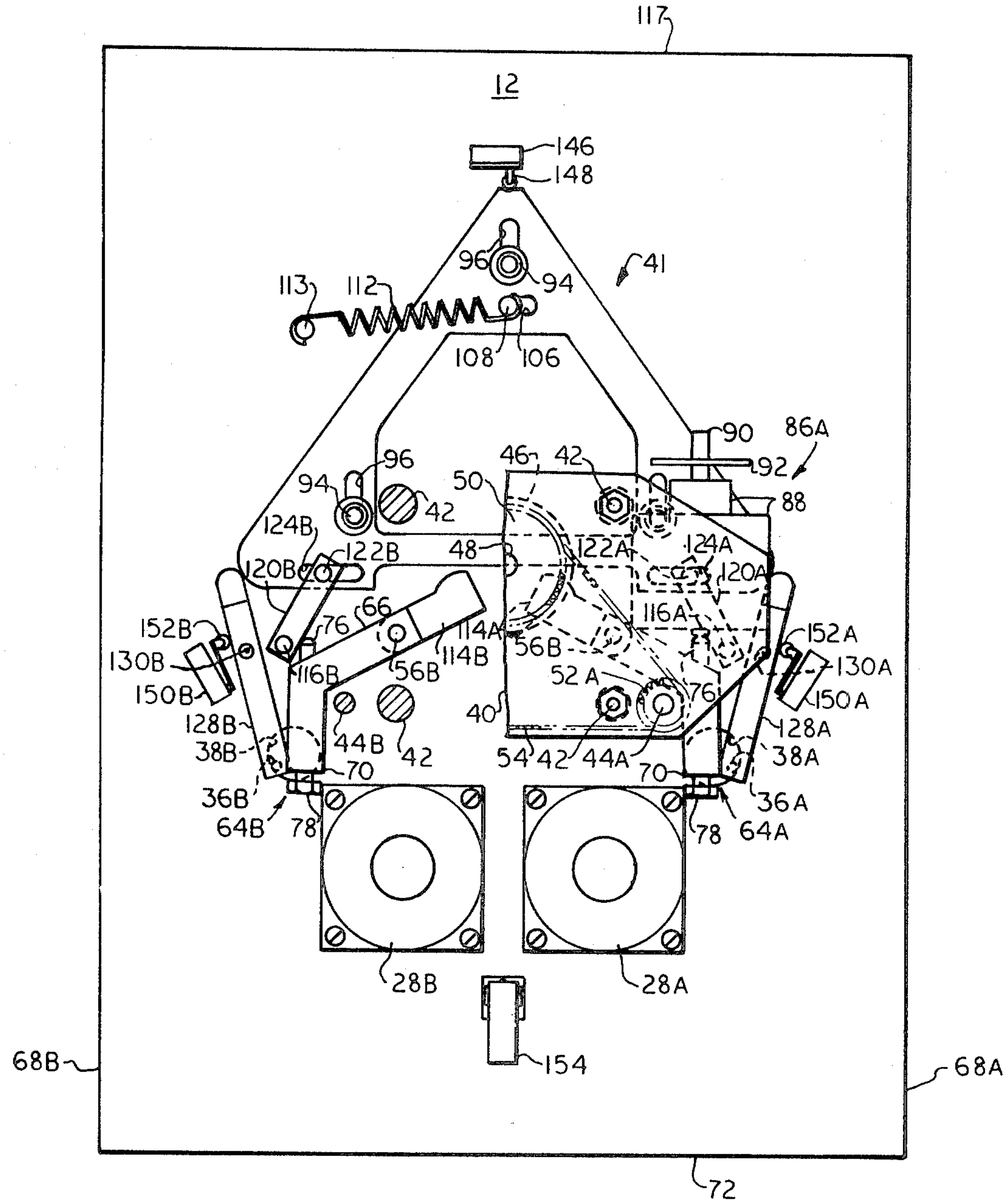
FIG. 3 is a rear elevation of the embodiment, certain components being broken away in the drawing for clarity.
Figure 10:
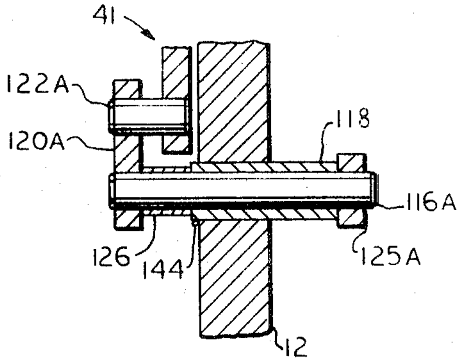
Figure 11:
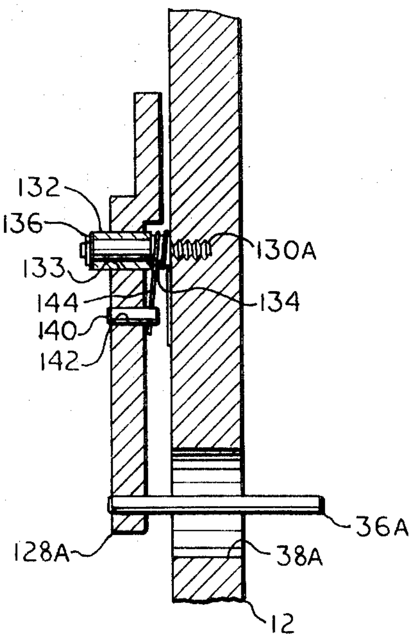

A second lever 114A, 114B is fixedly connected to each control shaft 56A, 56B adjacent panel 12 and extends laterally therefrom in diametrically opposed relation with the first lever 64A, 64B on the same shaft (see FIGS. 3 and 6). At the free end of each second lever is a curved projection which contacts a recessed portion of the lower edge of positioning plate 41. FIG. 3 also illustrates in end view two shafts 116A, 116B each of which is journaled in a bushing 118 (see also FIG. 10 which is a sectional view of panel 12 taken along the plane represented by line 10—10 in FIG. 3 and in the direction indicated therein) which in turn is fixedly positioned within an aperture in panel 12. The rear end of each bushing 118 projects a short distance from the rear side of the panel, while the forward end of said bushing projects a greater distance from the front side of said panel. Each shaft 116A, 116B projects from both ends of the bushing in which it is mounted and at its rear end is fixedly connected to one end of an arm 120A, 120B, the other end of the latter having fixedly mounted thereon a pin 122A, 122B the free end of which is slidably engaged within a respective one of two slots 124A, 124B formed in positioning plate 41 adjacent the lower edge thereof and extending in parallel relation therealong. A clamping arm 125A, 125B is fixedly connected to the forward end of each shaft 116A, 116B and projects laterally therefrom. A helical spring 126 is positioned around each a shaft 116A, 116B and disposed between the rear end of the associated bushing 118 and arm 120A, 120B. Two tensioning arms 128A, 128B are respectively pivoted to pins 130A, 130B which in turn are threadedly engaged within holes formed in the rear side of panels 12 and respectively located above the aforementioned holes 38A, 38B in the latter. More specifically, as illustrated in FIG. 11 which is a sectional view of the panel taken along the plane represented by line 11—11 in FIG. 3 and in the direction indicated therein, a bushing 132 is fixedly disposed within an aperture 133 in each tensioning arm and pin 130A or 130B extends through this bushing and through an annular spacer 134 which is disposed between said bushing 132 and panel 12. A retainer 136 engages a groove in the end of each pin 130A, 130B to hold its tensioning arm 128A, 128B thereon. Each tensioning arm is also provided with a pin 36A, 36B which projects from the lower end thereof through a respective one of the holes 38A, 38B, and with a pin 140 which is fixed within an aperture 142 located adjacent aperture 134, said pin 140 projecting from the side of the tensioning arm which faces the panel. Wound around spacer 134 is a torsion spring 144 one end of which engages pin 140 and the other end of which engages the end of the adjacent bushing 118 in which shaft 116A or 116B is mounted. The arrangement of the aforesaid torsion springs is such that they urge the lower end of tensioning arms in the direction indicated by the arrows located within holes 38A, 38B in FIG. 3.

An electrical switch 146 having an actuation contact 148 is attached to the rear side of panel 12 adjacent the upper edge 116 thereof, an electrical switch 150A, 150B having an actuation contact 152A, 152B is attached to said rear side adjacent each tensioning arm 128A, 128B, and an electrical switch 154 having an actuation contact 156 (see FIG. 1 and 3) is attached to said rear side adjacent the lower edge 72 thereof, said actuation contact 156 projecting from the forward end of a bushing 158 which in turns projects from the forward side of panel 12.

OPERATION

Although apparatus constructed in accordance with the principles of the disclosed invention is not limited to use with magnetic tape cartridges or to such cartridges of a single design, the embodiment which has been described utilizes a two-reel cartridge 20 which is supplied by Minnesota Mining and Manufacturing Company of St. Paul, Minnesota and which comprises a plate 160 that is mounted between the walls of said cartridge for movement parallel to the side edges thereof. Plate 160 is urged toward the lower edge of the cartridge by means of a spring (not shown) so that when the cartridge is removed from panel 12 the lower end of the plate enters a recess 162 formed in said lower edge and the sides of the plate respectively engage reels 22A, 22B to thereby prevent the latter from rotating. Furthermore, plate 160 is closer to the rear side of the cartridge (i.e., the side of the cartridge which must be next to panel 12) than it is to the front side thereof. When the cartridge is placed on support 14 with its rear side next to the panel, the lower end of plate 160 engages bushing 158 and the plate is thereby pushed upward relative to the cartridge, thus disengaging the plate from the reels. However, when the cartridge is placed on the support with its front side next to the panel, the lower end of plate 160 engages actuation contact 156 and moves it rearwardly to thereby actuate switch 154 so that electrically operated components of the tape deck are disconnected from their source of electric power. Thus the tape deck cannot be operated if the cartridge is improperly attached to panel 12.

When the tape deck is in use the components on the front side of panel 12 appear as illustrated in FIG. 1 and the components on the rear side of said panel appear as illustrated in FIG. 3. More particularly, lever 110 is turned to the position identified by the word "LOCK" on the right side of the panel and positioning plate 41 is thus moved toward the upper edge 117 of said panel and into engagement with the actuation contact 148 of switch 146, thereby actuating said switch so as to connect motors 28A, 28B to a source of electric power (not shown). These motors are arranged in such manner that torque is applied to drive shaft 30A which tends to rotate it in the counterclockwise direction as viewed in FIG. 1, and torque of equal magnitude is applied to drive shaft 30B which tends to rotate it in the clockwise direction as viewed in the same drawing. When positioning plate 41 is moved to the upper, or first, position thereof, the pins 122A, 122B which are respectively engaged within slots 124A, 124B in said positioning plate cause arms 120A, 120B to rotate to the position thereof that is illustrated in FIG. 3. The clamping arms 125A, 125B connected to shafts 116A, 116B are thus respectively rotated over the upper corners of cartridge 20 and together with support 14 hold the cartridge in fixed position on panel 12. The length of the portion of each bushing 118 which projects from the front side of the panel is slightly less than the thickness of the cartridge, so that clamping arms 125A, 125B are spaced from the ends of the bushings when they engage the cartridge and thus hold the latter against the panel under the force exerted against shafts 116A, 116B by springs 126. When positioning plate 41 is moved to its upper position on the panel the second levers 114A, 114B also move to the position thereof that is illustrated in FIG. 3, thus rotating control shafts 56A, 56B to a predetermined angular position relative to the panel wherein pinch roller supports 58A, 58B are positioned as illustrated in FIG. 1 and pinch rollers 60A, 60B respectively engage tape 24 and hold the same against capstans 44A, 44B. As can be seen in FIG. 3, the positioning plate disengages from the free ends of second levers 114A, 114B after the rollers are supported by the capstans. At the same time the free ends of first levers 64A, 64B are moved downward, Being supported by the rods 76 of the first levers, the drive members 90 of actuators are thus also permitted to move downward. However, when the control shafts are in said predetermined angular position and before actuators 86A, 86B are energized, the disks 92 are spaced from the upper end of the casings 88 of said actuators, as illustrated in FIG. 3 in the case of actuator 86A. Movement of the positioning plate to its upper position also permits the lower ends of tensioning arms 128A, 128B to rotate in the direction indicated by the arrows which are located within holes 38A, 38B in FIG. 3, the springs 144 being arranged to cause such rotation of the tensioning arms, as previously mentioned hereinbefore. As is also illustrated in FIG. 3, the positioning plate is disengaged from the tensioning arms when it is in the upper position thereof and, as can be seen in FIG. 1, the pins 36A, 36B on the tensioning arms are engaged with tape 24 and force the vertically extending portions of the same toward the side edges 68A, 68B of the panel. The tensioning arms thus cooperate with the torque motors 30A, 30B as a damper in keeping the tape taut. The arrangement of switches 150A, 150B and their actuation contacts 152A, 152B is such that the operation of stepping motor 46 is stopped when the tension applied to the tape exceeds a predetermined limit and the tape pulls the lower ends of the tensioning arms 128A, 128B inwardly (i.e., in the directions opposite those indicated by the aforementioned arrows) beyond predetermined points.

Stepping motor 46 and actuators 86A, 86B are synchronously operated in the following manner is response to electrical signals generated by electrical components (not shown) which are operatively associated with the tape deck. If tape 24 is to be moved in the direction indicated by the arrow that is designated by the letter A in FIG. 1, stepping motor 46 is operated so as to rotate capstans 44A, 44B in the counterclockwise direction, as viewed in the last mentioned drawing. The solenoid of actuator 86A is simultaneously energized so that drive member 90 of the actuator is moved downward until the disk 92 thereon contacts the upper end of the casing 88 of said actuator providing a stop limit for the downward movement. As the drive member moves downward the rod 76 mounted in the bore 74 of first lever 64A is moved toward the nut 78 engaged within the lower end of said bore, first lever 64A being at this time held in fixed position since pinch roller 60A is supported upon capstan 44A. When disk 92 is engaged with the casing of actuator 86A, the spring 80 in the bore 74 of first lever 64A is compressed between nut 78 and the shoulder 82 on the rod 76, and torque is thus applied to control shaft 56A which increases the pressure exerted against tape 24 by roller 60A and capstan 44A. Furthermore, the pressure which is exerted against the tape by either of the pairs of pinch rollers and capstans, when actuator 86A or 86B is operated, can readily be selected by changing the position of the nut 78 within the bore 74 of the first lever 64A, 64B associated with the particular roller-capstan pair. When tape 24 is to be moved in the direction indicated by arrow A, actuator 86B is not operated and therefore the pressure exerted upon the tape by pinch roller 60B and capstan 44B is only that which results from the arrangement of first and second levers 64B and 114B, roller support arm 58B, and said roller 60B (the weight of the laterally extending first lever and the roller support arm tending to press roller 60B against capstan 44B and the weight of the laterally extending second lever tending to lift the roller away from said capstan). Since stepping motor 46 is arranged so that both capstans 44A, 44B are rotated in the same direction, each roller-capstan pair exerts force upon tape 24 which moves it in the direction indicated by arrow A. The translating force exerted upon the tape by roller 60A and capstan 44A is greater, however, than the translating force exerted upon 44B. Hence the tape is kept taut between the roller-capstan pairs. Although the torque exerted upon reel 22B by motor 30B tends to move the tape in the opposite direction, this torque is overbalanced by the translating forces exerted upon the tape by the roller-capstan pairs and the torque exerted upon reel 22B by motor 30A. It will be obvious that the tape can be moved in the direction of reel 22B by reversing motor 46 so that capstans 44A, 44B are rotated in the clockwise direction as viewed in FIG. 1, and by energizing the solenoid of actuator 86B instead of that of actuator 86A.

When lever 110 is turned to the position marked "LOAD" on the left side of panel 12 (see FIG. 5), pin 108 moves positioning plate 41 to the second position thereof which is illustrated in FIG. 4. Disengagement of the positioning plate from actuation contact 148 actuates switch 146 to disconnect electric power to all electrically operated components of the tape deck. The downward movement of the positioning plate rotates the lower ends of tensioning arms 128A, 128B toward each other and thereby disengages pins 36A, 36B from tape 24. The free ends of second levers 114A, 114B are simultaneously moved downward and thus the free ends of first levers 64A, 64B are moved upward, which lifts drive members 90 of actuators 86A, 86B upward. The free ends of arms 120A, 120B are also moved downward, which rotates clamping arms 125A, 125B to the position thereof which is illustrated in FIG. 5 and permits the removal cartridge 20 from panel 12.

It will be understood from the foregoing description that rods 76 serve as force transmitting members which are respectively mounted on part of the support structures for rollers 60A, 60B and which are resiliently biased toward the first position illustrated in FIG. 8 by means of springs 80. Furthermore, the force transmitting members are movable to a second position by the drive members 90 of actuators 86A, 86B and when in said second position they exert forces upon rollers 60A, 60B which move the same toward capstans 44A, 44B, respectively, thereby applying pressure to tape 24 which is disposed between said rollers and capstans. It will also be obvious that other embodiments may readily be devised which utilize the basic design of the components which have been disclosed herein for the purpose of illustration and example. Hence the scope of the invention must be considered as being limited only by the terms of the following claims.

What is claimed as new and useful and desired to be secured by U.S. Letters Patent is:

1. In a tape deck, means for controlling the tension of movement of a magnetic tape past a recording or reproducing head in either direction of tape travel comprising in combination a pair of capstans having a fixed spaced relationship and having a like direction of rotation selectively in either direction, a roller associated with each of said capstans for passing said tape therebetween, separate and independent support means for each of said rollers, a force transmitting member carried by each of said roller support means and movable between first and second positions thereon, means associated with each of said roller support means for resiliently biasing said force transmitting member toward said first position, whereby when said force transmitting member is moved to said second position force is exerted on said roller support means to move said roller toward its associated capstan to drive the tape thereby in tension between the capstans, and an actuator associated with each capstan adapted to move said force transmitting member selectively from said first position to said second position.

2. The combination defined in claim 1 wherein each of said actuators comprises a solenoid, a drive member movable by said solenoid when the latter is energized, and stop means associated with said drive member for stopping the movement of said drive member when it moves said force transmitting member to said second position.

3. In a tape deck the combination comprising a panel, a magnetic tape head mounted on one side of said panel, two drive shafts mounted on said panel for rotation about their own longitudinal axes and projecting perpendicularly from said one side so that two reels can be respectively engaged therewith, means operatively associated with said tape deck and adapted to apply oppositely directed torques to said drive shafts so that tape wound on said reels and extended therebetween can be placed under predetermined tension, guide means on said panel for supporting said extended tape at points located on opposite sides of said magnetic head, two capstans mounted on said panel for rotation about their own longitudinal axes and projecting perpendicularly from said one side to engage said extended tape at points respectively located between said guide means and said reels, drive means operatively associated with said tape deck for conjointly and reversibly rotating said capstans in the same direction, two control shafts mounted on aid panel for rotation about their own longitudinal axes and projecting perpendicularly from said one side, said extended tape being disposed between said control shafts and said capstans, a roller support fixedly connected to and extending laterally from each of control shafts, a roller mounted on the free end of each roller support for rotation about an axis parallel with the longitudinal axes of said control shafts and capstans, said roller supports and said rollers being arranged so that the latter hold said extended tape against said capstans when each control shaft is rotated to a predetermined angular position relative to said panel, a lever fixedly connected to and extending laterally from each control shaft, a force-transmitting member mounted on each lever for movement relative thereto, biasing means on each lever for resiliently urging the force-transmitting member associated therewith toward a first position thereon, two actuators fixed in position relative to said panel and each comprising a solenoid, a drive member movable in a first direction by said solenoid when the latter is energized, and stop means for limiting the movement of said drive member in said first direction, whereby when said control shafts are rotated to said predetermined angular positions force can be selectively exerted upon by said force-transmitting members by said drive members so as to move said force-transmitting members to a second position on their levers and thereby cause said biasing means to exert force on said levers which increases the pressure exerted by said rollers on said tape disposed between the same and said capstans.

4. The combination defined in claim 3 including means on each lever for varying the force which the biasing means thereon exerts against the lever when the associated force transmitting member is in said second position on said lever.

5. The combination defined in claim 3 wherein each lever is formed at its free end with an aperture having a reduced diameter at one end thereof and the longitudinal axis of which is disposed transverse to the longitudinal axis of the control shaft associated with the lever, wherein each force-transmitting member is a rod slidably mounted in the aperture of the lever associated therewith and formed with a shoulder which when said member is in said first position on said lever abuts the shoulder formed in said aperture at the reduced diameter portion thereof, and wherein said biasing means on each lever comprises a nut engaged within said aperture in the latter and a helical spring positioned around the rod in said aperture and one end of which abuts the inner end of said nut and the other end of which abuts the shoulder on said lever, whereby the force which said spring exerts against said rod to urge the same toward said shoulder in said aperture can be controlled by changing the position of said nut within said aperture.

6. The combination defined in claim 3 wherein said reels are held in a cartridge and said reel support means comprises two electric torque motors mounted on the rear side of said panel, an aperture being formed in said panel adjacent each of said motors and the drive shafts of said torque motors respectively extending through said apertures and engaging said reels.

7. The combination defined in claim 3 wherein said panel has a hole formed therein on each side of said magnetic head, said extended tape lying over said holes, and including two tensioning arms each pivoted at a point intermediate the ends thereof to the rear side of said panel and one end of which is disposed over a respective one of said holes, a pin mounted on said one end of each of said tensioning arms extending laterally therefrom through the hole adjacent thereto, said pins contacting said extended tape when said tensioning arms are in a first angular position relative to said panel and being disengaged from said extended tape when said tensioning arms are in a second angular position relative to said panel, biasing means associated with each of said tensioning arms for resiliently urging the same toward said first angular position thereof, a positioning plate mounted on the rear side of said panel for movement between a first position wherein it is disengaged from said tensioning arms and a second position wherein it engages the ends of said tensioning arms remote from said pins and rotates said tensioning arms to said second angular position thereof, and means associated with said positioning plate for moving the same between said first and second positions thereof.

8. The combination defined in claim 7 wherein each of said tensioning arm biasing means comprises a spring.

9. The combination defined in claim 7 including a second lever fixedly connected to each of said shafts and extending laterally therefrom, said positioning plate engaging the free ends of said second levers when it is moved to said second position thereof and thereby rotating said shafts to a second angular position wherein said rollers are disengaged from said extended tape.

10. The combination defined in claim 7 wherein said reels are held in a cartridge and said reel support means comprises a support member fixedly attached to the front side of said panel and adapted to engage the bottom edge of said cartridge and hold the same in fixed position relative to said panel, two shafts journaled in said panel and projecting from both sides thereof, a clamping arm fixedly connected to each shaft and extending laterally therefrom in predetermined spaced relation with the front side of said panel, a lever fixedly connected to each shaft and extending laterally therefrom on the rear side of said panel, and a cam mounted on the free end of each of said levers and extending laterally therefrom, said positioning plate having formed therein two slots in which said cams are respectively disposed, whereby movement of said positioning plate to said first position thereof rotates said clamping arms to a first position wherein they engage the outer surface of said cartridge when the latter is engaged with said support bar, and movement of said positioning plate to said second position thereof rotates said clamping arms to a second position wherein they are disengaged from said cartridge.

* * * * *